United States Patent [19]

Setoyama

[11] Patent Number: 4,673,952

[45] Date of Patent: Jun. 16, 1987

[54] DRIVING DEVICE FOR A THERMAL ELEMENT

[75] Inventor: Youichi Setoyama, Tokyo, Japan

[73] Assignee: NEC Corporation, Tokyo, Japan

[21] Appl. No.: 621,395

[22] Filed: Jun. 18, 1984

[30] Foreign Application Priority Data

Jun. 16, 1983 [JP] Japan ............................ 58-108052

[51] Int. Cl.[4] ........................................ G01D 15/10

[52] U.S. Cl. ............................ 346/76 PH; 400/120; 364/519

[58] Field of Search ............... 358/296, 298; 364/518, 364/519; 340/800, 801, 786; 377/75, 76; 346/76 PH, 76 R, 154; 400/120; 219/216, 216 PH

[56] References Cited

U.S. PATENT DOCUMENTS 4,335,968 6/1982 Regnault ....................... 346/76 PH
4,415,908 11/1983 Sugiura ......................... 346/76 PH
4,514,738 4/1985 Nagato et al. ...................... 346/1.1

FOREIGN PATENT DOCUMENTS 0151775 9/1983 Japan ................................. 358/296

*Primary Examiner*—Arthur G. Evans
*Attorney, Agent, or Firm*—Sughrue, Mion, Zinn, Macpeak and Seas

[57] ABSTRACT

A driving device producing a drive signal according to a first information which has been received in the device and a second information to be received therein needs a plurality of latch circuits. Therefore, timing control of the device is very complex. However, the device can be controlled by a small number of timing control signals by means of a proposed novel architecture. Consequently, the device can be provided by a semiconductor chip with a small number of external terminals and is particularly suitable for a hybrid integrated circuit unit like a thermal printing head.

8 Claims, 10 Drawing Figures

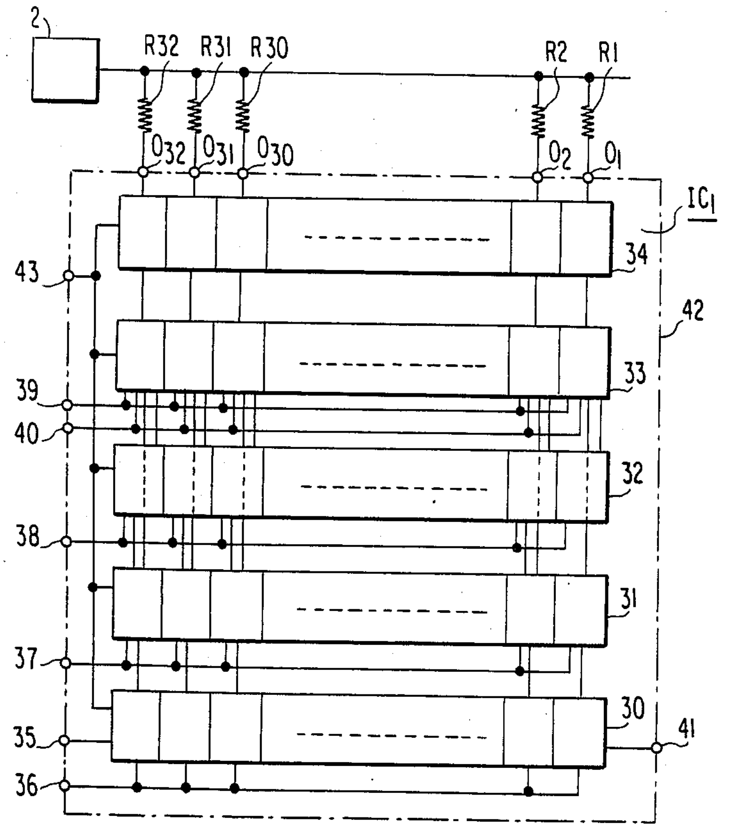
FIG. 2
PRIOR ART
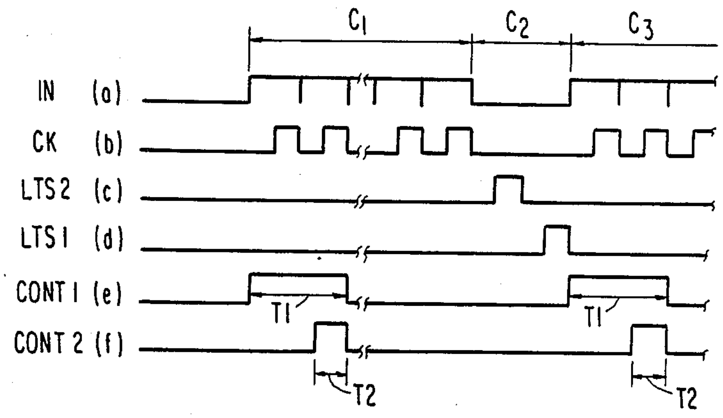
FIG. 3
PRIOR ART
FIG. 5
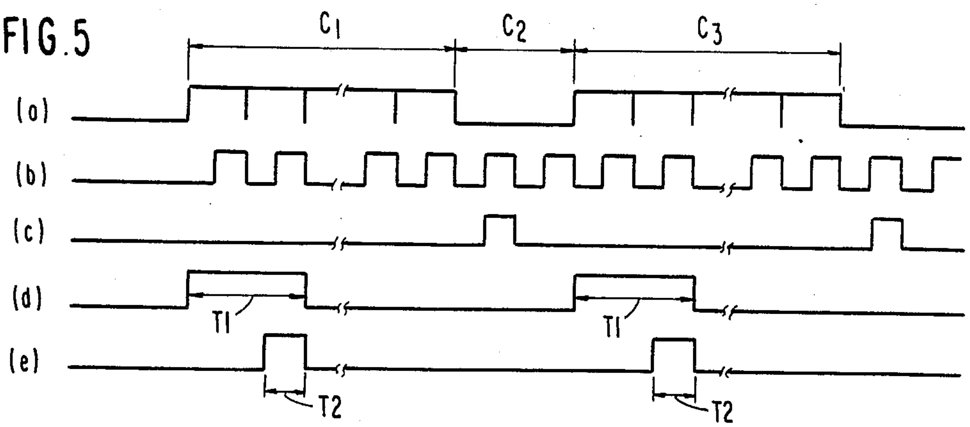

DRIVING DEVICE FOR A THERMAL ELEMENT

BACKGROUND OF THE INVENTION

1. Field of the Invention

The present invention relates to a driving device for driving a thermal element, and more particularly to a driving device used in a thermal printing apparatus having a thermal printing head, such as a thermal printer and a thermal printing facsimile machine.

2. Description of the Prior Art

A well known thermal printing head is formed on a ceramic substrate and has many thermal elements arranged in a line on the substrate. The head length is the same as the ISO A4 paper width. It has 8 dots per mm heating resistor (thermal element) density. If the size of a heating resistor is 100 (μm)×200 (m), the number of heating resistors is 1664. These resistors are in general divided into a plurality of small groups (e.g. 32 resistors/group). When one group has 32 heating resistors, 52 driving devices are required for deriving 1664 thermal dots. In order to realize high-speed printing, driving devices are provided on the ceramic substrate together with heating resistors.

A driving device receives the printing information and applies a driving current to the respective resistor according to the received information. The resistor through which a driving current flows generates thermal energy. In this manner, a black character or other information may be printed on a heat sensitive paper.

A conventional driving device has a receiving circuit for receiving information and a latch circuit for temporarily storing the received information. The latch circuit is used to realize high-speed printing operation. That is, by inserting the latch circuit between the receiving circuit and a driver circuit, an input operation to the receiving circuit can be executed in parallel with an output operation from the latch circuit to the driver circuit. In other words, when a driving current is supplied to a heating resistor according to the information in the latch circuit, a next new information to be printed can be set in the receiving circuit at the same time. However, it is to be noted that two timing control signals are required, each to control a receiving operation and a latch operation, respectively.

In a high-speed printing operation, the idle time when no driving current flows to a heating resistor is short. Where the nonconducting period is short and the black information requires consecutive energization of the same heating resistor, the heating resistor becomes overheated. As a result, a printed pattern is not clear. Moreover, the heating resistor may be damaged and even destroyed.

In order to avoid these problems, a driving device having two latch circuits has been proposed. A first latch circuit is used to store the information to be printed, which is transferred from the receiving circuit. A second latch circuit is used to store the information which has just been printed. The current conducting time is controlled according to contents of both the first and second latch circuits. If a black information is stored in the first latch and a white information is stored in the second latch, a first predetermined period is given as a current conducting time. If a black information is stored in the first latch and a black information is stored in the second latch, a second predetermined period shorter than the first predetermined period is given as a current conducting time. Thus, overheating of the same heating resistor can be avoided.

However, since the second latch circuit must be added, a new timing signal to latch the information of the first latch circuit into the second latch circuit is necessary. Therefore, three timing signals (the receiving timing signal, the first latch timing signal and a second latch timing signal) are required and are applied to the driving device through signal lines formed on a ceramic substrate. In addition, control signals for controlling current conducting times are required. Therefore, many signals are applied to the driving device through the respective signal lines. In general, electrical connecting signal lines and the driving device are made by using bonding wires. As described above, since the driving device must input many signals, many bonding wires must be used.

As previously discussed, a thermal printing head generates a large amount of heat energy, so that the driving device located near the head is significantly affected by the generated heat energy. Since bonding wires are not thermostable, the reliability of the connections is low. Therefore, a small number of bonding wires is better. However, if timing signals increase by one, 52 additional bonding wires are required on the substrate in the above case.

Moreover, wide signal lines are preferred, in order to accommodate high-speed signal transmission, and gold or other precious metal is used in such signal lines. Therefore, a small number of signal lines is better in a low cost thermal printing head and a low cost driving device.

Electrical terminals of the driving device may be connected to the signal lines on the substrate by means of a direct-bonding technique, for example a flip chip assembly technique, instead of wire-bonding. However, reliability of directly bonded connecting portions is low, just as with wire-bonding, and the number of the timing signals cannot be reduced.

SUMMARY OF THE INVENTION

An object of the present invention is to provide a driving device which can control a thermal element with a small number of timing signals.

Another object of the present invention is to provide a semiconductor driving device having a novel architecture by which contact portions of a driving device and signal lines on a thermal printing head can be reduced.

A still another object of the present invention is to provide a driving device which can reduce the cost of a thermal printing apparatus.

A driving device for a thermal element according to the present invention comprises a receiving means for receiving information to be printed, a receiving timing signal, a latch timing signal and a control signal controlling a current conducting time for a thermal element, an input register storing the information according to said receiving timing signal, a first latch circuit for storing the information of said input register according to said latch timing signal, a second latch circuit coupled to said first latch circuit for storing the information of said first latch circuit according to said control signal, a third latch circuit coupled to said second latch circuit for storing the information of said second latch circuit according to said latch timing signal, and a control circuit coupled to the first latch circuit and to the third latch circuit for driving the thermal element in response to the control signal.

In this device, the control signal is used not only to control the current conducting time in the thermal element but also to transfer the information of the first latch circuit into the second latch circuit. The second latch circuit is inserted between an output end of the first latch circuit and an input end of the third latch circuit. The first latch circuit is used to store the information to be printed, while the second latch circuit is used to store the information which has been printed previously. It is noted that the latch signal is different from the control signal in timing phase.

According to the driving device of the present invention, a first information to be printed is initially stored in the first latch circuit. Then the information is sent to the control circuit and is simultaneously stored in the second latch circuit according to the control signal. In other words, a printing operation of the first information is executed in parallel with a storing operation of the first information into the second latch circuit. Further, at the same time the next information (a second information) can be received in the receiving circuit. Thereafter when the second information is stored in the first latch circuit according to the latch timing signal, the first information which has been printed is stored into the third latch circuit from the second latch circuit according to the same latch timing signal. Thus a previous information is kept in the third latch circuit and is used to determine a current conducting time for the second information to be printed at a next printing operation. In the next printing operation, the control circuit determines a current conducting time for the thermal element according to the second information sent from the first latch circuit and the first information kept in the third latch circuit and sent therefrom in response to the control signal.

Though the number of latch circuits increases by one in the present invention, the number of timing signals for storing information decreases by one. Consequently, the number of terminals for receiving timing signals in the driving device decreases, and the number of contact portions to signal lines on a ceramic substrate also decreases. In addition the number of signal lines to be formed on the substrate further decreases. Therefore, thermal reliability of a thermal printing apparatus of the present invention can be increased over that of the prior art. Particularly, the expected life span of a thermal printing head can be extended.

Since all latch circuits used in the present invention have the same circuit design, the design of the driving device is made easy. Further, the addition of a latch circuit is no problem since all of latch circuits can be integrated into a single semiconductor chip. Finally, the work saved by decreasing in a signal line and a contact portion is greater than the added cost of another latch circuit.

Further, in the driving device according to the present invention, the control signal for controlling a current conducting time may be applied to the control circuit and to the second circuit from outside of the device or may be generated in the device. However, the timing signal and the control signal are used in common in all of the devices on a substrate, and therefore, it is preferred that these signals be applied to the devices through signal lines on the substrate. Of course, a substrate need not be a ceramic but may be a printed circuit board or the like. Further, driving devices may be provided on a different substrate from a substrate on which thermal elements are formed.

Other objects and advantages of the present invention will be apparent from the detailed description of preferred embodiments thereof and from the attached drawings.

BRIEF DESCRIPTION OF THE DRAWINGS

FIG. 2 shows a block diagram of a conventional driving device and thermal elements;

FIG. 3 shows a timing chart of a driving operation according to the conventional driving device of FIG. 2;

FIG. 5 shows a timing chart of a driving operation of the driving device in FIG. 4;

DESCRIPTION OF THE PREFERRED EMBODIMENTS

Figure 1:
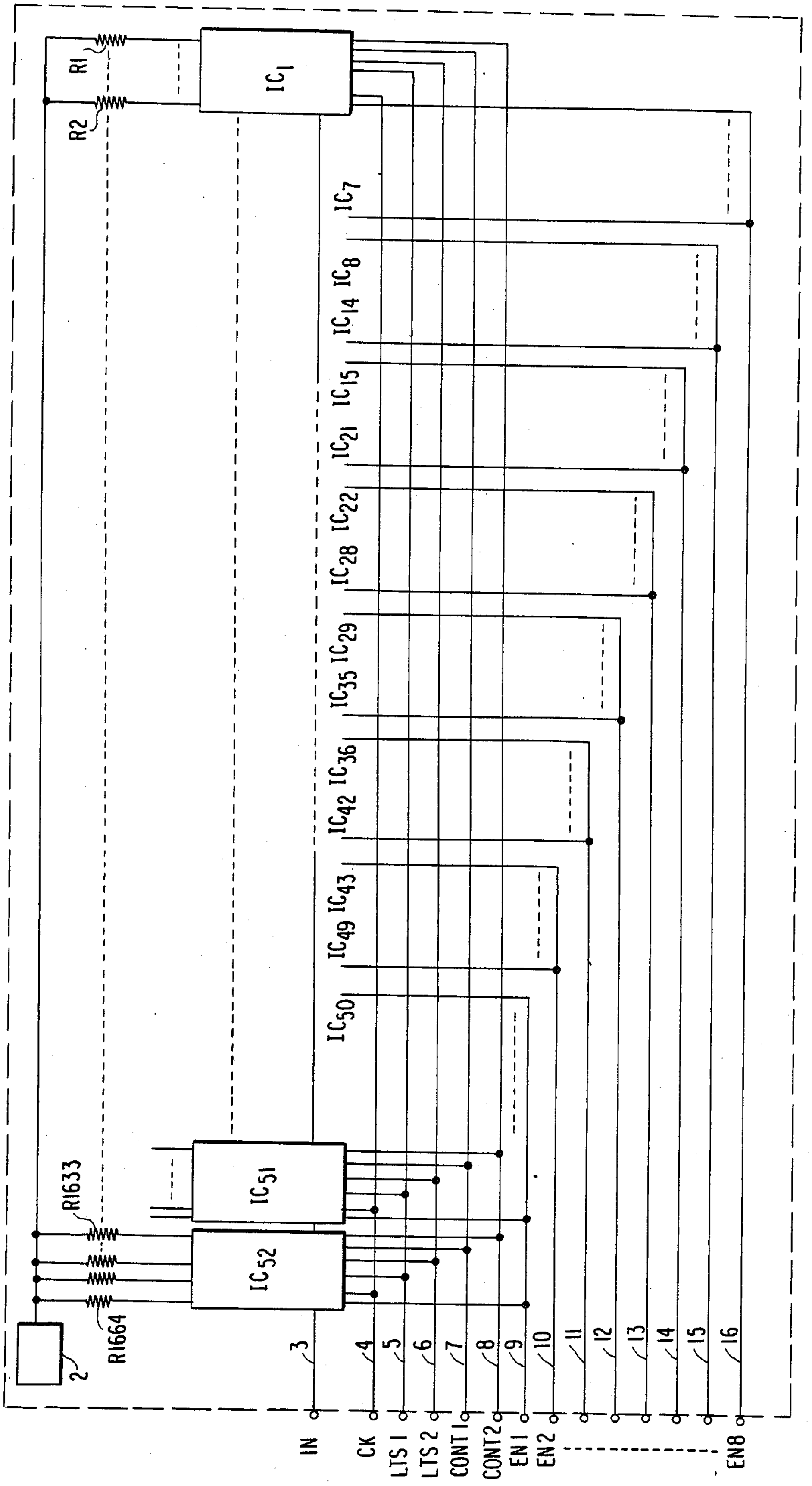
FIG. 1 PRIOR ART
FIG. 1 shows a block diagram of a conventional thermal printing head.

FIG. 1 illustrates a block diagram of a prior art thermal printing head having 1664 thermal elements (heating resistors) and 52 driving devices on a ceramic substrate. 1664 resistors R1 through R1664 are arranged in a line on a rectangular ceramic substrate 1 with a predetermined span. Fifty-two (52) driving devices $Ic_1$ through $IC_{52}$ are placed on the ceramic substrate 1. Each driving device is a semi-conductor device and drives 32 resistors. That is, 1664 resistors are divided into 52 groups, each of which has 32 resistors, and are set between a power source 2 and the respective driving devices. Each of the drive devices $IC_1$ to $Ic_{52}$ has a receiving circuit for receiving information to be printed. Information to be printed are transferred via an input terminal IN of the substrate 1 and are applied to the driving devices through an input signal line 3. The applied information is set in the receiving circuit according to a clock signal supplied from a clock signal terminal CK through a clock signal line 4. Each driving device has two latch circuits therein. The latch circuits store a received information in the receiving circuit in response to two independent latch timing signals LTS1 and LTS2 which are applied through timing signal lines 5 and 6, respectively. A first latch circuit is coupled to the receiving circuit and stores the received information in response to the latch timing signal LTS1. A second latch circuit is coupled to the first latch circuit and stores the information in the first latch circuit in response to the latch timing signal LTS2. The driving devices receive two control signals CONT1 and CONT2 through control signal lines 7 and 8 and execute a current conducting operation. Further, eight (8)

signal lines 9 to 16 are formed on the substrate 1 to transfer enable signals EN1 to EN8 for activating the driving devices. The fifty-two (52) driving devices are divided into 8 groups, that is $IC_1$ to $IC_7$, $IC_8$ to $IC_{14}$, $IC_{15}$ to $IC_{21}$, $IC_{22}$ to $IC_{28}$, $IC_{29}$ to $IC_{35}$, $IC_{36}$ to $IC_{42}$, $IC_{43}$ to $IC_{49}$, and $IC_{50}$ to $IC_{52}$. Each group is selected by the respective enable signal and is activated by a time sharing system. These enable signals are used to drive heating resistors R1 to R1664 according to the time sharing system. Namely, resistors are divided into 8 groups, each of which are sequentially driven in a different operation cycle, respectively. If there are no enable signals EN1 to EN8, all resistors are driven at the same time, so that a large amount of thermal energy is generated at the same time. As a result, resistors and driving devices may be damaged or may be destroyed by a large thermal energy. To avoid this thermal damage, enable signals are used.

Figure 10:
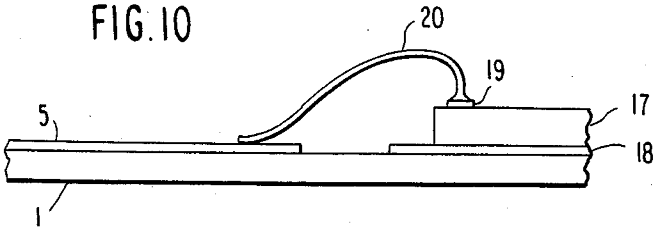
FIG. 10 shows an illustrative view, in part, of the connecting portions of a driving device and signal lines on a substrate.

An example of an electrical contact of a driving device and a signal line on the substrate is illustrated in FIG. 10. A semiconductor chip 17 of the driving device is fixed at a metalized portion 18 on the ceramic substrate 1. The chip 17 has a bonding pad 19 which is used as a connecting portion. The pad 19 is connected to a signal line, for instance the latch signal line 5 by a bonding wire 20. In general, the signal line and the bonding wire consist of a precious metal (e.g. a gold, a silver) for good heat radiation and high-speed signal transmission. Therefore, it is desired to reduce the number of signal lines and bonding wires in order to provide a low-cost thermal head. Further, it is important to reduce a number of contact portions in order to increase the reliability of the head.

On the other hand, a conventional driving device is designed as shown in FIG. 2. FIG. 2 illustrates a block diagram of the driving device IC, in FIG. 1. The driving device IC, has a shift register 30 as a receiving circuit, latch circuits 31 and 32, a gate circuit 33 and a driver circuit 34 on a single semiconductor chip 42. Terminals 35 to 40 in an input section and terminals $0_1$ to $0_{32}$ in an output section are connected to signal lines on the substrate 1 by means of bonding wires as shown in FIG. 10. A terminal 35 is connected to the input signal line 3. A terminal 36 is connected to the clock signal line 4. Terminals 37 and 38 are connected to latch timing signal lines 5 and 6, respectively. Terminals 39 and 40 are connected to control signal lines 7 and 8, respectively. Output terminals $0_1$ to $0_{32}$ are connected to 32 heat resistors $R_1$ to $R_{32}$, respectively. The terminal 43 is used to receive the enable signal EN8 by which the device $IC_1$ is activated.

To reduce the number of signal lines of the substrate 1 and bonding wires, a serial input is used. Therefore, the shift register 30 consisting of 32-bit shifter is used as a receiving circuit, and shifts a bit string of input information to be printed from left to right. A terminal 41 is an ouput terminal to shift input information to an adjacent driving device.

An operation of the driving device $IC_1$ in FIG. 2 will be described in below referring to FIG. 3 showing a timing chart.

Thirty-two bits of an input information shown in (*a*) of FIG. 3 are set in the shift register 30 according to a shift clock signal applied through the terminal 36 in a cycle $C_1$. In a next cycle $C_2$, a latch timing signal LTS shown in (*c*) of FIG. 3 is first applied to the latch circuit 31 through the terminal 38, thus 32 bits of information in the latch circuit 31 are transferred to and are stored in the latch circuit 32 in response to the latch timing signal LTS2. That is, at this time, a previous information which has been printed and has been kept in the latch circuit 31 is temporarily stored in the latch circuit 32. The stored information in the latch circuit 32 is used to determine a current-conducting period for the heating resistors. At the next timing in the cycle $C_2$, the latch timing signal LTS1 shown in (*d*) of FIG. 3 is applied to the latch circuit 31 through the terminal 37, thus the received information (32 bits) in the shift register 41 is stored in the latch circuit 31. At this state, the information to be printed in a cycle $C_3$ is stored in the latch circuit 31, while the information which has been printed in the cycle $C_1$ is stored in the latch circuit 32.

In the cycle $C_3$, the shift register 30 is empty, and therefore, a new information to be printed in a following cycle can be set in the shift register 30 according to the shift clock CK. At this state, the control signal CONT1 shown in (*e*) of FIG. 3 is applied to the gate circuit 33 through the terminal 39. The driving circuit 34 has 32 switching elements (not shown). The switching element is turned on when a black information is set in the respective block in the latch circuit 31, while the switching element is turned off when a white information is set therein. The information in the latch circuit 31 is applied to the switching element through the gate circuit 33 during the period $T_1$. However, if the information in the latch circuit 32 is a black information in this period, the black information in the latch circuit 31 is stopped from being transferred to the switching element in the period $T_2$ shown in (*f*) in FIG. 3. This is controlled by the control signal CONT2 applied to the gate circuit 33 through the terminal 40. If the information in the latch circuit 32 is a white information, the information to be printed is applied to the switching element in the period $T_2$ from the latch circuit 31. In other words, when the information which as been printed in the previous cycle $C_1$ is a black information, the information to be printed in the cycle $C_3$ is applied to the driving circuit 33 during only $T_1$–$T_2$ period. However, when the previous information is a white information, the information to be printed is applied to the driving circuit 33 during $T_1$ period. Thus, a current conducting time of the heating resistors can be controlled according to the information in the latch circuits 31 and 32, so that a thermal energy generated by the resistor can be controlled.

However, the conventional driving device in FIG. 2 needs 7 input terminals 35 to 40 and 43 in the input section, and more particularly needs the two latch timing signals 37 and 38. Therefore, two signal lines 5 and 6 are necessary on the substrate, and two bonding wires shown in FIG. 10 are required. In FIG. 1, since 52 devices are formed on the substrate 1, 52×2 bonding wires are necessary to connect the devices to the latch timing signal lines 5 and 6.

Figure 4:
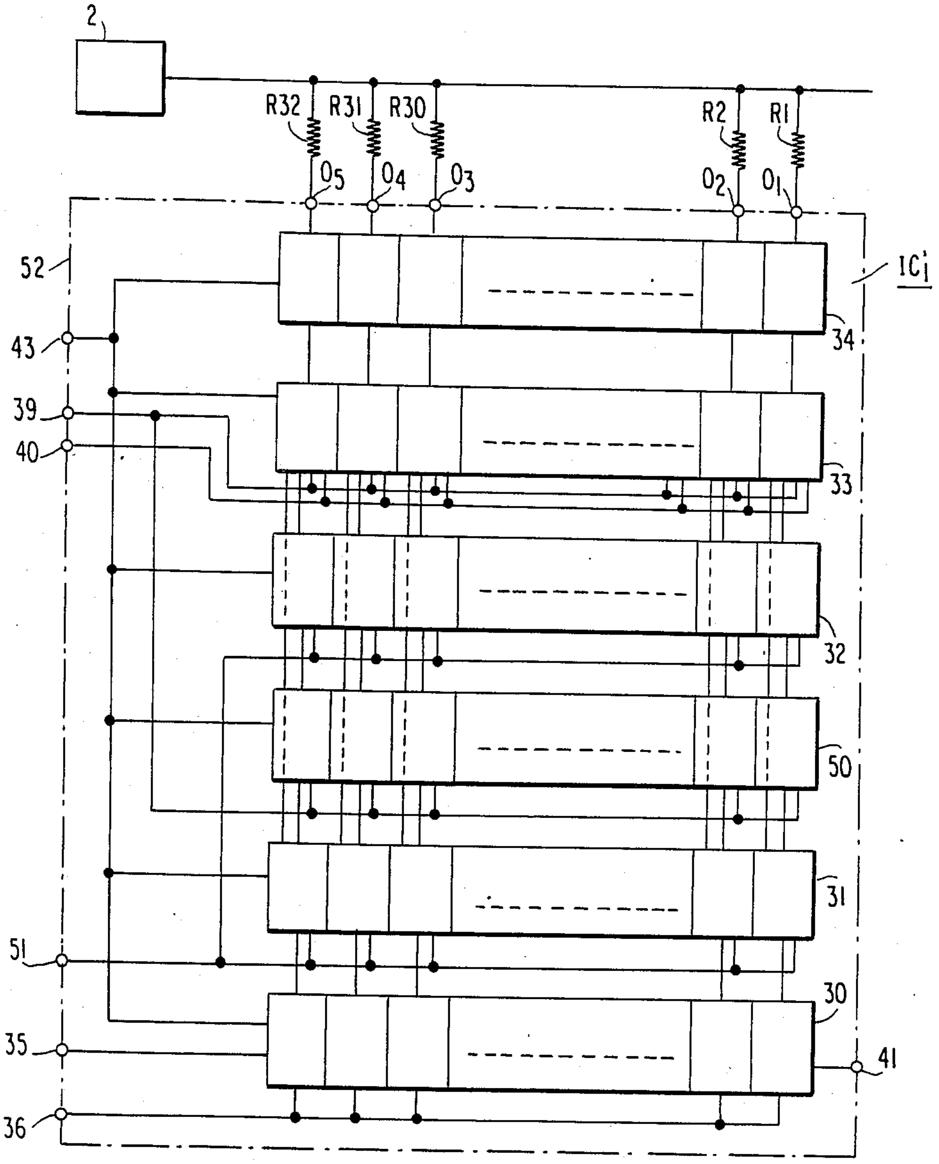
FIG. 4 shows a block diagram of a driving device according to an embodiment of the present invention.

FIG. 4 illustrates a block diagram of a driving device according to an embodiment of the present invention. It is assumed that the same reference numerals as FIGS. 1 and 2 are same circuits as that of FIGS. 1 and 2.

The driving device $IC_1'$ according to the FIG. 4 includes the shift register 30, the latch circuits 31 and 32, the gate circuit 33 and the driving circuit 34 as well as FIG. 2. Further, the device in FIG. 4 has a third latch circuit 50 which may be the same circuit as the latch circuits 31 and 32. The shift register 30 receives an input information through the terminal 35 according to the shift clock signal applied through the terminal 36. The first control signal CONT1 and the second control signal CONT2 are applied through terminals 39 and 40 to the gate circuit 33, respectively. The enable signal EN8 is applied to the device through the terminal 43 for selecting and activating the device $IC_1'$. It is noted in FIG. 4 that only one latch timing signal LTS is applied to the latch circuits 31 and 32 in common through a terminal 51. Further, the first control signal is not only applied to the gate circuit 33 but to the latch circuit 50 in common.

In the driving device the latch circuit 50 is added but the number of terminals in the input section is decreased by one. That is, only one latch timing signal is needed according to the present invention. The circuits 30 to 34 and 57 can be integrated in a single semiconductor chip 52 by means of a large scale integration technique. The first latch circuit 31 is coupled to the shift register 30 and stores an information received in the shift register 30 in response to the latch timing signal applied through the terminal 51. The second latch circuit 32 is coupled to the third latch circuit 50 and stores temporarily the information set in the third latch circuit 50 in response to the latch timing signal from the terminal 51. At the same time, the first latch circuit 31 stores the new information from the shift register 30. An input end of the third latch circuit 50 is coupled to the first latch circuit 31 while an output end is coupled to the second latch circuit 32. The third latch circuit 50 receives the information in the first latch circuit 31 in response to the first control signal applied through the terminal 39 at the same time that the information set in the first latch circuit 31 is transferred to the gate circuit 33 and is printed on a thermal sensitive paper. That is, the first latch circuit 31 stores the information to be printed, while the second latch circuit 32 stores the previous information which has been printed in the previous cycle and has been set in the third latch circuit 50.

FIG. 5 shows a timing chart of a driving operation of the diving device illustrated in FIG. 4. In the cycle $C_1$, a first information block (32-bit string), shown as (*a*) in FIG. 5, is set in the shift register 30 according to a shift clock signal (*b*). Thereafter, the latch timing signal (*c*) is applied to the latch circuits 31 and 32 in common during the cycle $C_2$. During cycle $C_2$, the first information to be printed is stored in the first latch circuit 31. In addition, the information which has been printed in the cycle $C_1$ and has been stored in the third latch circuit 50 at the period $T_1$ in the cycle $C_1$ is shifted to the second latch circuit 32. Thus, the second latch circuit 32 can keep the previous information to control a current conducting time as described before.

In the next cycle $C_3$, the first control signal CONT1 is applied to the gate circuit 33 through the terminal 39 during the period $T_1$. At this moment, the information in the first latch circuit 31 is sent to the driving circuit 34 via the gate circuit 33 and is stored in the third latch circuit 50. At the peiod $T_2$ in the cycle $C_3$, the second control signal (*e*) is applied to the gate circuit 33. If the previous information set in the second latch circuit 32 is a black information, an application of the information in the first latch circuit to the driving circuit 34 is stopped by the gate circuit 33. While, if the previous information is a white information, the information of the first latch circuit 31 is continuously sent to the driving circuit 34 in the period $T_2$. Thus, the current conducting time in the resistors $R_1$ to $R_{32}$ is controlled by the information to be printed and the previous information which has been printed.

According to the driving device in FIG. 4, the number of terminals in the input section may be 6 because of common use of the first control signal CONT1. Therefore, the signal line needed to apply the second latch timing signal CONT2 is unnecessary. In addition, its contact portion and a bonding wire are not required. Consequently, one signal line and 52 bonding wires can be omitted on the substrate of a thermal printing head. Thus, a low-cost and a high-reliability thermal printing apparatus can be provided according to the present invention.

Figure 6:
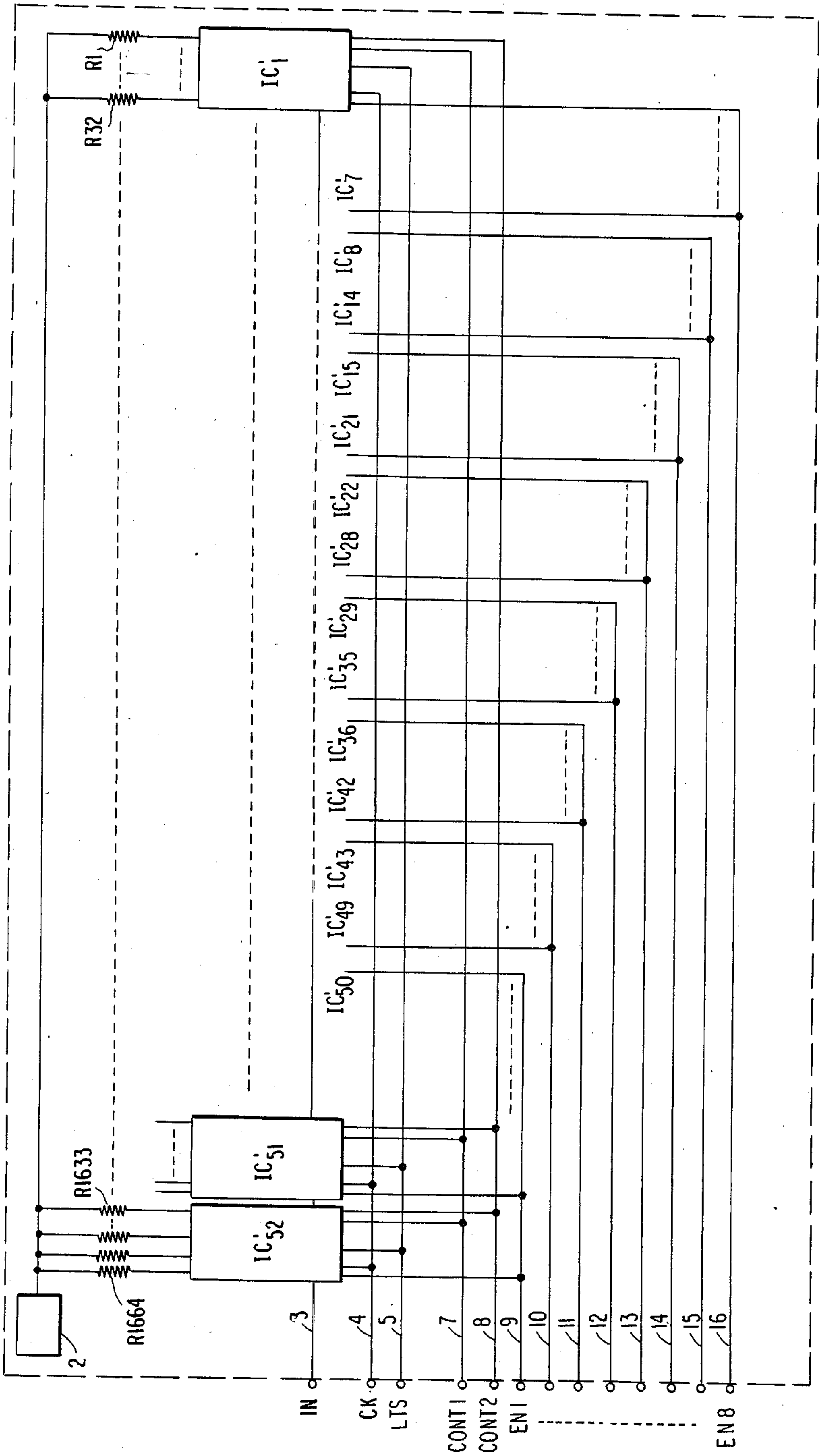
FIG. 6 shows a block diagram of a thermal printing head using driving devices of the present invention in FIG. 4.

A thermal printing head, in which the driving devices of the present invention are used, is shown in FIG. 6. As clear in FIG. 6, the head does not require either the first latch timing signal or the second latch timing signal. Further, if a control circuit to produce the second control signal CONT2 according to the first control signal CONT1 is integrated in each driving device, the signal line 8 can be omitted.

Figure 7:
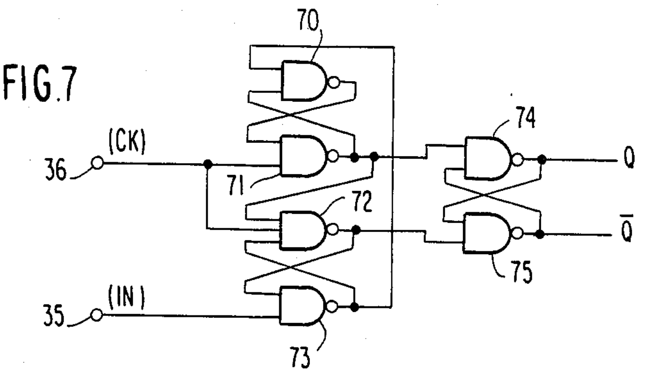
FIG. 7 shows an example of a logical circuit diagram used in a principal part of a receiving circuit of the driving device in the present invention.
Figure 8:
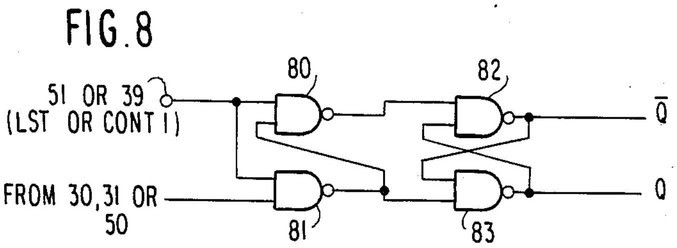
FIG. 8 shows an example of a logic circuit used in a principal part of a latch circuit in the driving device according to the present invention.
Figure 9:
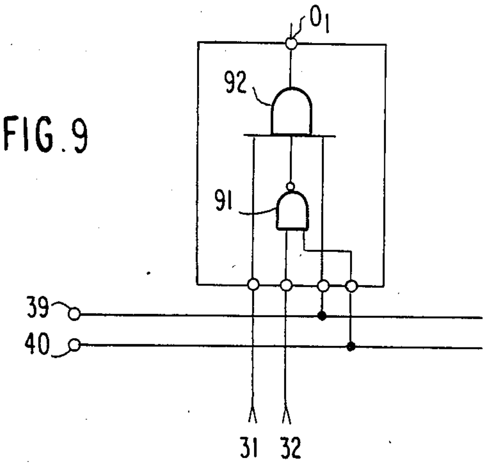
FIG. 9 shows an example of a logic circuit used in a gate circuit that controls the driving device according to the present invention.

FIGS. 7 to 9 illustrate logic circuits of a part of the shift register 30, a part of the latch circuits 31, 32 and 50, and a part of gate circuit 34. FIG. 7 is a circuit of one stage of the shift register 30 wherein three flip-flop circuits are constructed by NAND gates 70 and 71, 72 and 73, and 74 and 75. The NAND gate 73 receives an information applied through the terminal 35 according to the shift clock signal from the terminal 36. The flip-flop (74 and 75) stores the received information and outputs it as Q and $\overline{Q}$ to a next stage. FIG. 8 is a circuit of one stage of latch circuits. NAND gates 80 and 81 respond to the latch timing signal or the first control signal CONT1 and transfers an information from 30, 31 or 50 to a flip-flop (82, 83) for temporarily storing the information transferred from the NAND gate 81. FIG. 9 shows a circuit of one stage of the gate circuit 33 connected to the resistor $R_1$. Information from the first latch circuit 31 is applied to an AND gate 92 directly, while an information from the second latch circuit 32 is applied to the AND gate 92 via an NAND gate 91. The first control signal CONT1 from the terminal 39 is applied to the AND gate 92. The second control signal CONT2 from the terminal 40 is applied to the NAND gate 91. The NAND gate 91 is inactivated and the second control signal CONT2 is not applied, so that the information to be printed is derived from the output end $0_1$. On the other hand, when the CONT2 is applied to the NAND gate 92, the information from 31 is blocked from the output end $O_1$ if the previous information from 32 is a black information ("1" level signal). Alternatively, if the previous information is a white information ("0" level signal), the information from 31 is passed from the output end $O_1$ during the period that CONT2 is applied.

What is claimed is:

1. A driving device for a thermal element comprising a receiving means for receiving information to be printed, a receiving timing signal, a latch timing signal and a control signal controlling a current conducting time for said thermal element, an input register storing the information to be printed according to said receiving timing signal, a first latch coupled to said input register and storing the information of said input register according to said latch timing signal, a second latch coupled to said first latch for storing the information of said first latch according to said control signal, a third latch coupled to said second latch for storing the information of said second latch according to said latch timing signal and a control circuit coupled to said first and said third latch for driving said thermal element in response to said control signal.

2. A driving device for producing a drive signal applied to a thermal element comprising a receiving means for receiving an information by which said drive signal is produced, first to third means for storing said information received in said receiving means at a different timing, respectively, and a driving means producing said drive signal according to a control signal which designates a period that said drive signal is applied to said thermal element, said first means storing the information in said receiving means in a first period, said second means storing said information in said first means in a second period succeeding to said first period, said third means storing said information in said second means in a third period succeeding to said second period, and a new information to be used to produce a next drive signal being stored in said first means in said third period.

3. A driving device having first, second and third latch circuits on a single semiconductor chip comprising means for producing a drive signal according to contents of said first and said third latch circuits, means for coupling said first and said second latch circuits to said producing means, means for coupling an input end of said second latch circuit to an output end of said first latch circuit, means for coupling an output end of said second latch circuit to an input end of said third latch circuit, means for controlling latch operations of said first circuit and said third latch circuit at the same time, and means for controlling a producing operation of said producing means and a latching operation of said second latch circuit at the same time.

4. A device for driving thermal elements comprising:

a first terminal serially receiving a plurality of groups of data signals;

a second terminal receiving a latch timing signal;

a third terminal receiving a first driving signal;

a register means coupled to said first terminal for storing each one group of data signals, a first latch means coupled to said second terminal and said register means for storing a group of data signals stored in said register means in response to said latch timing signal;

a second latch means coupled to said third terminal and said first latch means for storing a group of data signals stored in said first latch means in response to said first driving signal;

a third latch means coupled to said second terminal and said second latch means for storing a group of data signals stored in said second latch means in response to said latch timing signal;

a driving means for driving said thermal elements in response to a group of data signals applied thereto; and a transferring means coupled to said third terminal and said first latch means for transferring a group of data signals stored in said first latch means to said driving means in response to said first driving signal.

5. A driving device as claimed in claim 4, in which said receiving circuit, said first, second and third latch circuit and said driving circuit are integrated in a single semiconductor chip.

6. A driving device as claimed in claim 2, in which storing operations of said first means and said third means are executed simultaneously according to a first timing signal, while a driving operation of said driving means is executed simultaneously when said second means receives and stores the information in said first means in response to a second timing signal generated after said first timing signal has been applied to said first and third means.

7. The device as claimed in claim 4, further comprising a fourth terminal receiving a second driving signal and a controlling means coupled to said fourth terminal, said transferring means and said third latch means for controlling said transferring means in response to said second driving signal such that the transfer of the group of data signals from said first latch means to said driving means is allowed or inhibited in accordance with the data signals stored in said third latch means.

8. The device as claimed in claim 4, wherein said first driving signal drives said transferring means to transfer a first group of data signals stored in said first latch means to said driving means and at the same time drives said second latch means to write said first group of data signals into said second latch means while said register means receives a new group of data signals which is subsequent to said first group of data signals and thereafter said latch timing signal drives said first latch means to store said new group of data signals in said first latch means from said register means and at the same time drives said third latch means to write said first group of data signals into said third latch means from said second latch means.

* * * * *